US010460269B1

(12) United States Patent
Hamburger et al.

(10) Patent No.: US 10,460,269 B1
(45) Date of Patent: Oct. 29, 2019

(54) SPACE DATASET OPTIMIZATION (71) Applicant: MASTERCARD INTERNATIONAL INCORPORATED, Purchase, NY (US)

(72) Inventors: Jackson Hamburger, Arlington, VA (US); David Kim, McLean, VA (US); Bradley Stankey, Washington, DC (US); Fu Shek Li, Arlington, VA (US)

(73) Assignee: Mastercard International Incorporated, Purchase, NY (US)

( * ) Notice: Subject to any disclaimer, the term of this patent is extended or adjusted under 35 U.S.C. 154(b) by 194 days.

(21) Appl. No.: 15/653,242

(22) Filed: Jul. 18, 2017

(51) Int. Cl.
*G06Q 10/06* (2012.01)
*G06Q 30/02* (2012.01)

(52) U.S. Cl.
CPC ... *G06Q 10/06315* (2013.01); *G06Q 30/0201* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 7,440,903 B2 * | 10/2008 | Riley | ................. | G06Q 10/0631 705/1.1 |
| 8,010,404 B1 * | 8/2011 | Wu | ........................ | G06Q 30/02 705/1.1 |
| 8,032,406 B2 * | 10/2011 | Ouimet | .................. | G06Q 10/04 705/7.35 |
| 8,838,469 B2 * | 9/2014 | Bottom | .............. | G06Q 10/0637 705/7.37 |
| 8,930,235 B2 * | 1/2015 | Mihic | .............. | G06Q 10/06313 705/7.29 |
| 9,805,333 B1 * | 10/2017 | Bergstrom | ............. | G06Q 10/04 |
| 2003/0171979 A1 * | 9/2003 | Jenkins | ............ | G06Q 10/06375 705/7.37 |
| 2003/0200129 A1 * | 10/2003 | Klaubauf | ......... | G06Q 10/06315 705/7.25 |
| 2004/0133483 A1 * | 7/2004 | Potter | .................. | G06Q 10/087 705/28 |

(Continued)

FOREIGN PATENT DOCUMENTS

JP          2016164754 A   *   9/2016

OTHER PUBLICATIONS

Corstjens, Marcel, and Peter Doyle. "A model for optimizing retail space allocations." Management Science 27.7 (1981): 822-833. (Year: 1981).*

(Continued)

*Primary Examiner* — Alan S Miller
(74) *Attorney, Agent, or Firm* — Eric L. Sophir; Dentons US LLP (57) ABSTRACT

Disclosed method comprises receiving from a user interface, a request to generate an optimized space dataset; generating a first instruction configured to receive a first dataset comprising at least one of a space allocated to the product, product attribute, and product performance value corresponding to a plurality of institutions; automatically calculating an elasticity range based on the space allocated to the product; calculating an unbounded asymptote and elasticity values; upon the unbounded elasticity value being outside the elasticity range, dynamically adjusting the elasticity value based on the elasticity range; iteratively calculating a bounded asymptote value based on the second dataset data points until the asymptote value is within the adjusted elasticity range; and generating a graphical representation to illustrate an optimized space trend comprising plurality of data points.

20 Claims, 5 Drawing Sheets

(56) References Cited

U.S. PATENT DOCUMENTS

| | | | | |
|---|---|---|---|---|
| 2006/0149634 | A1* | 7/2006 | Pelegrin | G06Q 30/018 705/317 |
| 2007/0027745 | A1* | 2/2007 | Ouimet | G06Q 10/04 705/7.31 |
| 2007/0050235 | A1* | 3/2007 | Ouimet | G06Q 10/06375 705/7.31 |
| 2008/0147475 | A1* | 6/2008 | Gruttadauria | G06Q 10/087 705/7.31 |
| 2008/0208719 | A1* | 8/2008 | Sharma | G06Q 10/00 705/29 |
| 2009/0006156 | A1* | 1/2009 | Hunt | G06Q 10/063 705/7.11 |
| 2009/0018996 | A1* | 1/2009 | Hunt | G06Q 30/02 |
| 2010/0318403 | A1* | 12/2010 | Bottom | G06Q 10/0637 705/7.36 |
| 2011/0276364 | A1* | 11/2011 | Bergstrom | G06Q 10/04 705/7.29 |
| 2012/0317059 | A1* | 12/2012 | Joshi | G06Q 10/06 706/12 |
| 2013/0275277 | A1* | 10/2013 | Mihic | G06Q 10/06313 705/28 |
| 2014/0025420 | A1* | 1/2014 | Joshi | G06Q 10/06313 705/7.23 |
| 2015/0324725 | A1* | 11/2015 | Roesbery | G06Q 30/0639 705/7.39 |

OTHER PUBLICATIONS

Dreze, Xavier, Stephen J. Hoch, and Mary E. Purk. "Shelf management and space elasticity." Journal of retailing 70.4 (1994): 301-326. (Year: 1994).*

Corstjens, Marcel, and Peter Doyle. "A dynamic model for strategically allocating retail space." Journal of the Operational Research Society 34.10 (1983): 943-951. (Year: 1983).*

Baker, RC A., and Timothy L. Urban. "A deterministic inventory system with an inventory-level-dependent demand rate." Journal of the Operational Research Society 39.9 (1988): 823-831. (Year: 1988).*

Pinto, Fábio, Carlos Soares, and Pavel Brazdil. "Combining regression models and metaheuristics to optimize space allocation in the retail industry." Intelligent Data Analysis 19.s1 (2015): S149-S162. (Year: 2015).*

Souto, Luís Fernando Moreira. "Optimizing Shelf Space Allocation under Merchandising Rules." (2018). (Year: 2018).*

Kök, A. Gürhan, and Marshall L. Fisher. "Demand estimation and assortment optimization under substitution: Methodology and application." Operations Research 55.6 (2007): 1001-1021. (Year: 2007).*

Subrahmanyan, Saroja, and Robert Shoemaker. "Developing optimal pricing and inventory policies for retailers who face uncertain demand." Journal of Retailing 72.1 (1996): 7-30. (Year: 1996).*

Zufryden, Fred S. "A dynamic programming approach for product selection and supermarket shelf-space allocation." Journal of the operational research society 37.4 (1986): 413-422. (Year: 1986).*

Borin, Norm, Paul W. Farris, and James R. Freeland. "A model for determining retail product category assortment and shelf space allocation." Decision sciences 25.3 (1994): 359-384. (Year: 1994).*

Irion, Jens, et al. "A piecewise linearization framework for retail shelf space management models." European Journal of Operational Research 222.1 (2012): 122-136. (Year: 2012).*

Urban, Timothy L. "An inventory-theoretic approach to product assortment and shelf-space allocation." Journal of Retailing 74.1 (1998): 15-35. (Year: 1998).*

Bultez, Alain, et al. "Asymmetric cannibalism in retail assortments." Journal of Retailing 65.2 (1989): 153. (Year: 1989).*

* cited by examiner

SPACE DATASET OPTIMIZATION

TECHNICAL FIELD

This application relates generally to generating and manipulating datasets associated with efficient analytics processing.

BACKGROUND

Institutions desire to learn about an initiative's effectiveness. The institutions will continuously try to optimize the store layouts and arrangements in order to maximize their profit and predict customer performance given different scenarios. The institutions often attempt to maximize their sales and profit by optimizing the space within the store dedicated to certain commodities. In one conventional example, a retailer owns multiple stores that sell a variety of products. Conventional theories posit that a store will sell more commodities if the store displays more of that commodity (e.g., the store dedicates more space to said commodity). However, the concept of diminishing return explains that blindly increasing the space dedicated to a product is not necessarily the best solution to maximize profits. The diminishing return concept is the decrease in the marginal (incremental) output of a production process as the amount of a single factor of production is incrementally increased, while the amounts of all other factors of production stay constant. For example, continuing with the example above, if the retailer increases the space from 5% of the shelving units to 10%, the store may see a 100% increase in sales (e.g., sales may double); however, if the same retailer increases the space dedicated to the same product to 20% of all the shelving units, the store may not experience a 400% increase in sales (e.g., sales may not quadruple). Simply put, the law of diminishing returns states that in all productive processes, increasing one factor of production, while holding all others constant ("ceteris paribus"), will at some point (e.g., diminishing return point) yield lower incremental per-unit returns.

Conventional approaches to optimizing a space within a store based on customer behavior have been accomplished using a "trial-and-error" method of modifying the spaces and studying customer behavior utilizing "brute force" methods, such as analyzing sales in relation to the space allocated to products. For example, an institution may allocate more space to a product, analyze the sales associated with said product for a pre-determined period of time, and depending on the analysis, change the space allocated to the product and re-analyze the sales. As expected, this process is tedious and time consuming. The "trial-and-error" method is also inaccurate because many other factors associated with sales (e.g., seasonality, utility, or demand) may change throughout the analysis, which may yield unexpected and imprecise results. Furthermore, the "trial-and-error" method may not be suitable because it heavily relies on human subjectivity (e.g., the amount of space and/or the price are selected by the analyzers).

As the processing power of computers allow for greater computer functionality and the Internet technology era allows for interconnectivity between computing systems, many institutions use computers to optimize retail space. However, since the implementation of these more sophisticated online tools, several shortcomings in these technologies have been identified and have created a new set of technical challenges. Several existing and conventional software solutions provide the same "trial-and-error" method implemented on computing devices and fail to provide fast and efficient analysis due to a high volume of customer/store information existing on different networks and computing infrastructures. Managing such information on different platforms is difficult due to number, size, content, or relationships of the data associated with the customers. For example, optimizing space for a store that provides several products may entail calculating millions or billions of different and distinct combinations of sales and space. Conventional software solutions may take hours or even days to complete the analysis because there is often not enough processing power and time to search and analyze all different combination of the spaces, sales prices, and diminishing return values allocated to each product. Furthermore, many existing and conventional graphical user interfaces do not illustrate the optimized data (e.g., optimized spaces and projected sales trends) in a user-friendly manner. For example, conventional software solutions may produce large spreadsheets or large graphs comprising confusing data points.

SUMMARY

For the aforementioned reasons, there is a need for a more efficient and faster system, method, and a software solution for processing large space and sales datasets, which would allow institutions to optimize the space allocated to different products and study customer behavior (e.g., sales or other customer behavior) in a more efficient manner than possible with human-intervention or conventional computer data-driven analysis. There is a need for a network and computer-specific set of rules to produce efficient and accurate results when facing a high number of space and sales combinations. These features can perform time-consuming analysis in a more efficient manner and can generate custom control group datasets in a more efficient manner by using less computing power than other approaches, such as conventional software solutions. There is also a need for a more user-friendly graphical user interface to illustrate optimization trends and projections.

In one embodiment, a method comprises receiving, by a server from a user interface, a request to generate an optimized space dataset, wherein the received request comprises identification associated with a product and a first institution; generating, by the server, a first instruction configured to receive a first dataset comprising at least one of a space allocated to the product, product attribute, and product sales value corresponding to a plurality of institutions, wherein the plurality of institutions comprises at least the first institution; upon transmitting the first instruction to a first database, receiving, by the server, the first dataset; identifying, by the server, a plurality of first dataset data points, wherein each first dataset data point corresponds to the space allocated to the product and the product sales value associated with the plurality of institutions; automatically calculating, by the server, an elasticity range based on the space allocated to the product, wherein the elasticity range represents a maximum elasticity range value and a minimum range elasticity value each representing maximum and minimum product space value associated with the plurality of institutions; determining, by the server, an unbounded elasticity value and a corresponding asymptote value based on a second dataset, wherein the second dataset comprises second dataset data points corresponding to space allocated to the product and the product performance value associated with the first institution; in response to the unbounded elasticity value being outside the elasticity range, dynamically adjusting, by the server, the elasticity value based on the elasticity range; iteratively calculating, by the server, a bounded asymptote value and a bounded elasticity value based on the second dataset data points until the bounded asymptote and elasticity values are within the adjusted elasticity range, wherein a number of iterative calculations is based on the adjusted elasticity range and an incremental value; generating, by the server, a graphical representation of the second dataset data points, wherein the graphical representation is configured to illustrate an optimized space trend comprising plurality of data points; and generating, by the server, a second instruction configured to display plurality of second set data points on the user interface.

In another embodiment, a computer system comprising a server, which is configured to receive, from a user interface, a request to generate an optimized space dataset, wherein the received request comprises identification associated with a product and a first institution; generate a first instruction configured to receive a first dataset comprising at least one of a space allocated to the product, product attribute, and product sales value corresponding to a plurality of institutions, wherein the plurality of institutions comprises at least the first institution; upon transmitting the first instruction to a first database, receive the first dataset; identify a plurality of first dataset data points, wherein each first dataset data point corresponds to the space allocated to the product and the product sales value associated with the plurality of institutions; automatically calculate an elasticity range based on the space allocated to the product, wherein the elasticity range represents a maximum elasticity range value and a minimum range elasticity value each representing maximum and minimum product space value associated with the plurality of institutions; determine an unbounded elasticity value and a corresponding asymptote value based on a second dataset, wherein the second dataset comprises second dataset data points corresponding to space allocated to the product and the product performance value associated with the first institution; in response to the unbounded elasticity value being outside the elasticity range, dynamically adjusting, by the server, the elasticity value based on the elasticity range; iteratively calculate a bounded asymptote value and a bounded elasticity value based on the second dataset data points until the bounded asymptote and elasticity values are within the adjusted elasticity range, wherein a number of iterative calculations is based on the adjusted elasticity range and an incremental value; generate a graphical representation of the second dataset data points, wherein the graphical representation is configured to illustrate an optimized space trend comprising plurality of data points; and generate a second instruction configured to display plurality of second set data points on the user interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1:
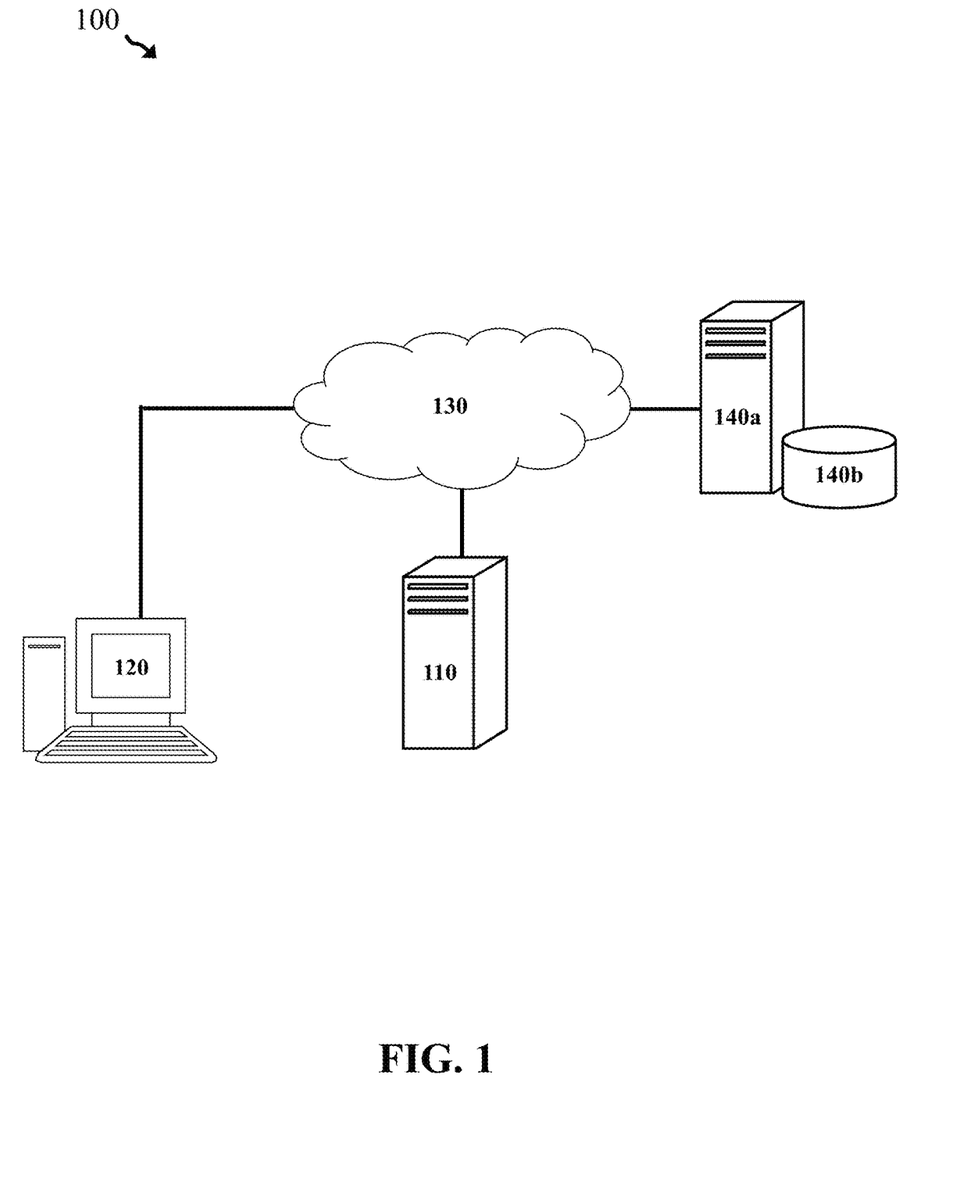
FIG. 1 illustrates an example of a system for generating an optimized space dataset, according to an embodiment.

FIG. 1 illustrates components of a system 100, according to an exemplary embodiment. The system 100 comprises an analytics server 110, a database server 140a and a database 140b of a database service provider, and a client device 120. The above-mentioned computing devices may communicate with each other via the communication network 130, such as the Internet. In operation, the client device 120 may request the analytics server 110 to derive various forms of analytical information from the data records of the database service provider. The database 140b, associated with the database service provider, may store data records that are associated with customer interactions where the data records each contain at least one field identifying which customer or customer account was associated with a particular interaction. For example, the database 140b may record the sales figures and other pertinent information (e.g., time of purchase, the location of the product in relation to other products, sales volume, product pricing trend, frequency of customer interactions) customer attributes (e.g., tenure, age, purchase power, demographics data) and the like. The database 140b may store data records generated and stored by a database server 140a during customer interactions at one or more stores associated with an institution and/or the data service provider. The database 140b may be hosted on any number of computing devices comprising a non-transitory machine-readable storage medium capable of storing data records received from the database server 140a, and in some cases, received from the analytics server 110, the client device 120, or other computing devices (e.g., point-of-sale systems, public websites, and the like). The database 140b may further comprise a processor capable of executing various queries and data record management processes, according to instructions from the analytics server 110 or the database server 140a. One skilled in the art would appreciate that the database 140b may be the same computing device as the database server 140a, or be hosted on a distinct computing device that is in networked-communication with the analytics server 110.

The analytics server 110 may perform various analytics on data records stored in the database 140b and transmit the results to the client device 120. The analytics server 110 may be any computing device comprising a processor capable of performing the various tasks and processes described herein. Non-limiting examples of the analytics server 110 may include a server, desktop, laptop, tablet, and the like. The analytics server 110 comprises any number of computer-networking components that facilitate inter-device communications via the communication network 130. One skilled in the art would appreciate that there may be any number of distinct computing devices functioning as the analytics server 110 in a distributed computing environment.

The database server 140a may communicate data records and instructions to and from the analytics server 110, where the data records may be stored into the database 140b and where various analytics may be performed on the data by the database server 140a in accordance with the instructions from the analytics server 110 and/or the client device 120. The database server 140a may be any computing device comprising a processor capable of performing the various tasks and processes described herein. Non-limiting examples of a database server 140a may include a server, desktop, laptop, tablet, and the like. The database server 140a comprises any number of computer-networking components (e.g., network interface card) that facilitate inter-device communications via the communication network 130. One having skill in the art would appreciate that there may be any number of distinct computing devices functioning as the database server 140a in a distributed computing environment.

The client device 120 may access a web-based service or application hosted by a database server 140a, from which customers may provide or request various types of personal and/or confidential data that may be stored in the database 140b. The client device 120 may be any computing device comprising a processor capable of performing the various tasks and processes described herein. Non-limiting examples of a client device 120 may include a server, desktop, laptop, tablet, and the like. The client device 120 comprises any number of computer-networking components (e.g., network interface card) that facilitate inter-device communications via the communication network 130.

Figure 2:
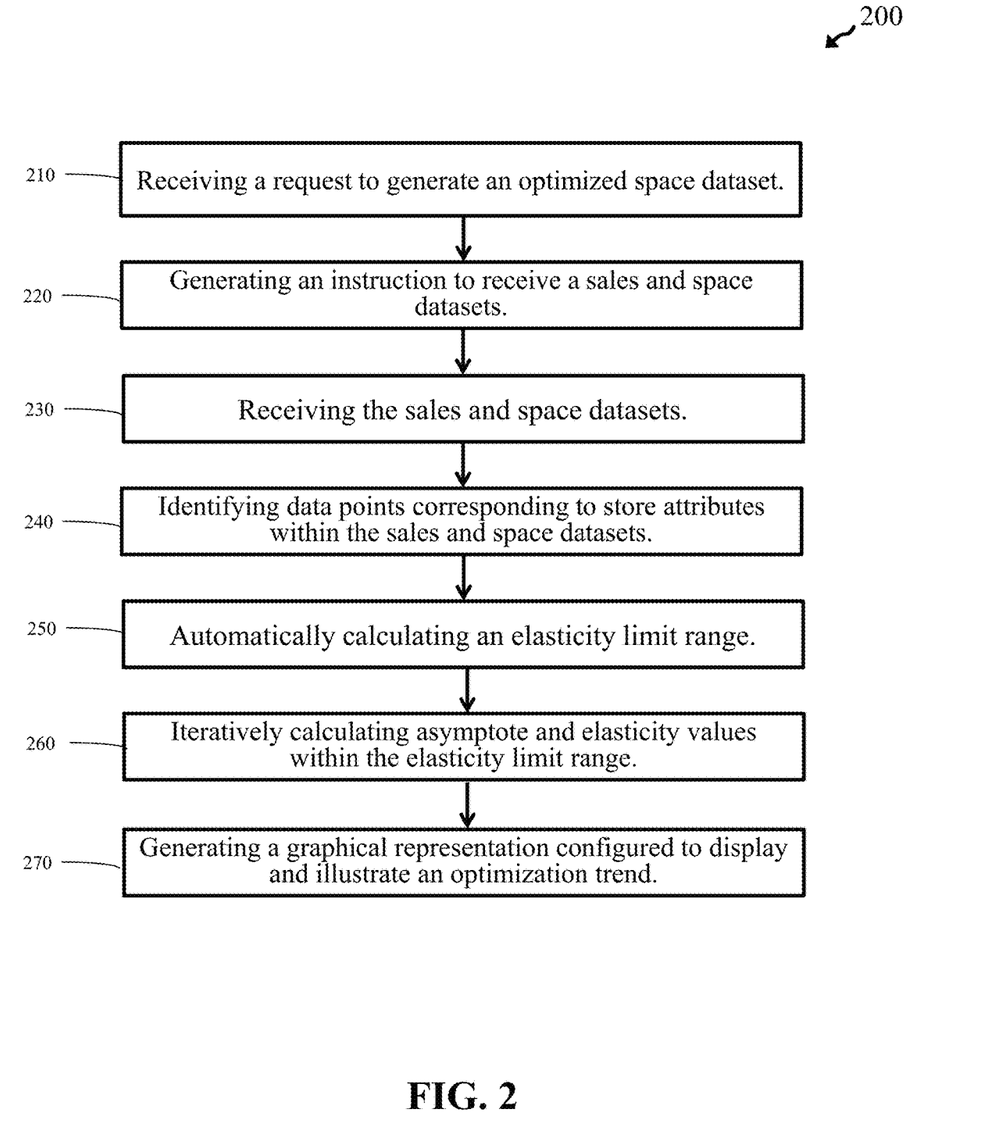
FIG. 2 illustrates a flowchart depicting operational steps of a method for generating an optimized space dataset, according to an embodiment.

Referring now to FIG. 2, a flowchart depicting operational steps of a method for optimizing a space dataset is illustrated in accordance with an embodiment. Steps of the method 200 may be implemented using one or more software modules executed by the analytics server, the client device, and/or the database service provider. FIG. 2 does not imply any limitations with regard to the environments or embodiments that may be implemented. Modifications to the depicted environment or embodiment shown in FIG. 2 may be made. While certain aspects may be illustrated herein with reference to optimizing space in relation to sales figures within a store, it is expressly understood that these embodiments can be configured to apply to a variety of other optimization services, such as optimization of any performance related to space.

At step 210, the analytics server may receive a request to generate an optimized space dataset. In some embodiments, the analytics server may receive this request from a client interacting with a user interface associated with the client device. For example, the analytics server may present a user interface (e.g., a website provided to the user operating the client computing device) configured to receive information related to the client and the client request. In other embodiments, the client request may be electronically inputted or transmitted to the analytics server using the communication network. The client request may comprise a request to analyze past performance (e.g., sales and space) of one or more stores within an enterprise and generate an optimized space dataset for a specific item a particular store (or multiple stores). The client request may further comprise information about the item to be analyzed. For example, the client request may comprise a request to generate an optimized space dataset for product X, which is sold in 150 stores nationwide. The client interacting with a user interface associated with the client device may be a client who is a business owner and would like to identify the best possible amount of space allocation to the product X within one or more stores nationwide.

At step 220, the analytics server may generate an instruction to receive sales and space datasets from the database service provider. The space and sales datasets may refer to all the information pertinent to product X's sales and space associated with each store within the enterprise. The database service provider, which is in communication with each store within the enterprise and associated with the client device, may collect records of attributes associated with product X within every store that offers product X (e.g., the space allocated to the product, the sales volume and amount, and the profit associated with product X). The analytics server may generate the instruction based on the client request received from the client device. The analytics server may transmit the instruction to the database server of the database service provider or any other server associated with the enterprise.

Upon transmittal of the instruction to the database server, at step 230, the analytics server may receive the sales and space datasets comprising all the customer information, and other pertinent information indicated within the client request. In some other embodiments, all the pertinent information regarding the test strategy may be received from the client request. For example, product X may only be provided by a small number of stores within the enterprise and the client, operating the user interface provided by the analytics server, may input the sales and space data associated with product X within all said stores.

At step 240, the analytics server may identify data points within the sales and space dataset. In some embodiments, the data points may refer to different attributes associated with product X (e.g., space allocated to product X within each store, the price, and the sales volume of the product X). In some embodiments, the sales and space dataset may comprise derivative information regarding product X (e.g., sales margin). A data point may refer to a simple coordinate, which corresponds to product attributes and sales volume. For example, the analytics server may organize the data points within the space and time dataset based on the space and sales attributes. In some embodiments, the analytics server may represent the organized data utilizing a graphic chart, such as the charts depicted in FIG. 3 and FIG. 4. The analytics server may also generate an instruction to display the graph on the client device or the user interface associated with the client device. This graphical organization may be used to show a distribution of products and the corresponding sales figures given different spaces within each store.

Figure 3:
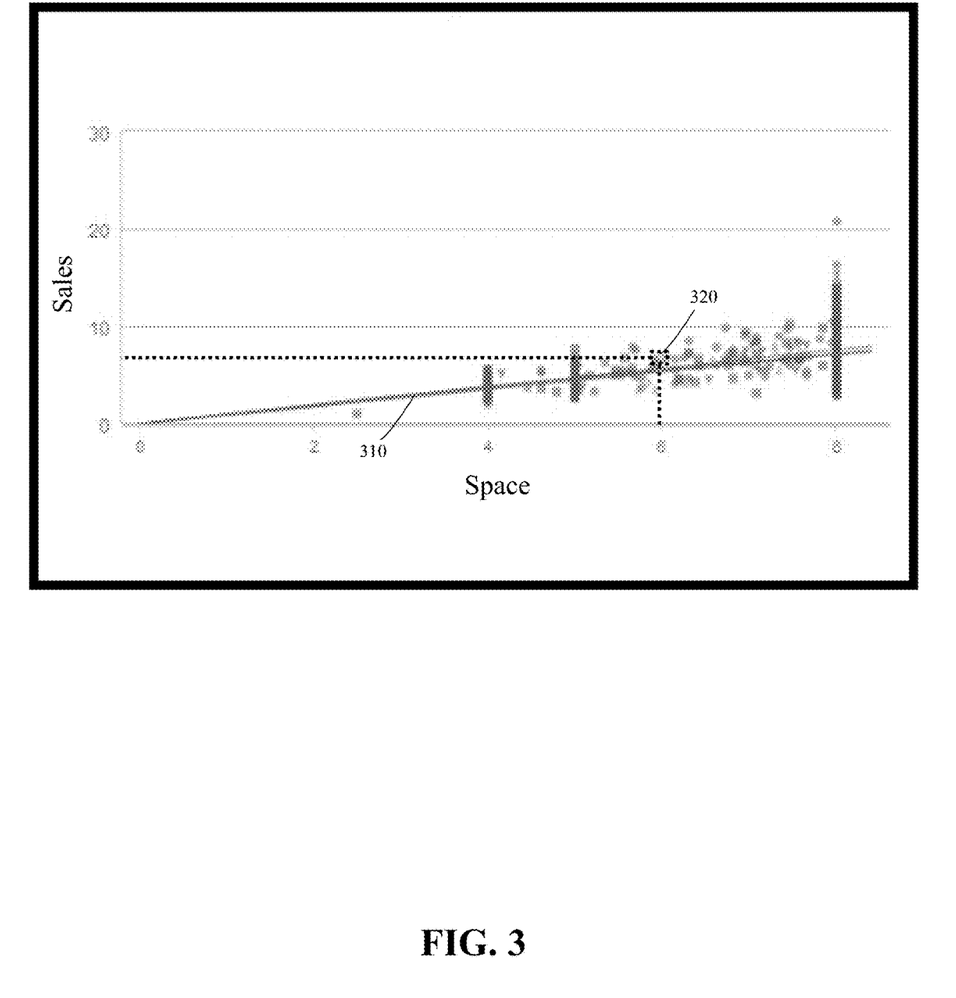
FIG. 3 illustrates distribution of sales in relation to space data points, according to an embodiment.

FIG. 3 illustrates distribution of sales in relation to the space allotted within a store, according to an embodiment. The X-axis in the graph illustrated in FIG. 3 represents the space allotted to product X and the Y-axis represents sales volume associated with product X. The analytics server may organize the data points received in step 240 and graphically represent them on the user interface on the client device. For example, data point 320 may represent the sales and space associated with product X within store B. Data point 320 comprises an X coordinate and a Y coordinate. In this embodiment, data point 320 represents that product X has been allotted 6 feet of shelve space within store B and has an $8000 sales volume.

At step 250, analytics server may calculate elasticity limit values. Elasticity, as used herein, refers to how fast or slow a graph (e.g., graph 310 or 410) reaches its asymptote. An asymptote is a line or a curve such that the distance between the curve/line approaches zero as the function approaches infinity. As used herein, asymptote is a line that indicates a sales value as the space reaches a large value (e.g., in theory, infinity). For example, consistent with the theory of diminishing return, as the space allocated to a particular product increases, the sales also increase up to a point (e.g., point of diminishing return); after the point of diminishing return, the sales may increase or decrease at a disproportionate rate. An asymptote is a line, which denotes no increase in sales when given an increase in space. For example, and referring to FIG. 4, data point 430 is the diminishing return data point or the beginning of the asymptote line, which means that any data point with a larger value than data point 430 on the X-axis (e.g., space) may not have a larger sales value. For example, data points 430, 420, 450, 460 respectively represent 0.25 ft, 0.75 ft, 1 ft, and 1.5 ft of space allocated to the same product within the same store. However, the sales volume associated with each of the data points remain unchanged (e.g., $500). In other words, graph 410 represents that even if the space allocated to product X increases from 0.25 ft. to 1 ft. or 1.5 ft., there will be no change in the sales volume. An elasticity value represents the distance (on the X-axis or the space) between the asymptote and the beginning of the graph. For example, in FIG. 4, distance 440 represents the elasticity of asymptote 410. A small elasticity value, such as the distance 440, may represent that a graph rapidly reaches its asymptote (e.g., the point of diminishing return is reached quickly). In contrast, a large elasticity value may represent that a graph will not reach its asymptote until a very large value of space is allocated to the product (e.g., the point of diminishing return is slowly reached). Function 310 of FIG. 3 represents a graph with a large elasticity. Function 310 is a sloped line and does not have a visible asymptote (e.g., the asymptote is not within the normal range of spaces within a store). As discussed above, both functions 310 and 410 represent unrealistic and undesirable results because they do not provide realistic space optimization within the physical space constraint of any store. The analytics server may try to limit the elasticity value in order to reach a more realistic and/or desirable representation of the sales and space.

The analytics server may calculate the elasticity limit values (e.g., upper and lower bounds) by analyzing data from all the stores within the enterprise. For example, all the stores that provide similar services may be analyzed in order to determine the elasticity limit values (e.g., T value). In some embodiments, the elasticity values are similar (or assumed to be similar) across all the stores. By definition, the elasticity is how fast a graph approaches its asymptote and therefore, this value may be assumed similar for all similar stores within an enterprise. In other words, a graphical representation of sales and space for a particular product is assumed to have the similar overall shape and different values. For example, the shape of the graph representing sales versus space in a grocery store in New York City is assumed to be similar to the shape of the graph representing sales versus space in rural Nebraska. The two graphs, however, may have different space and sales values as the store in New York City may have a higher sales volume than the store in rural Nebraska. The analytics server may use existing and empirical data associated with other stores within the enterprise to determine the elasticity values. In some embodiments, the analytics server may determine the upper limit of the elasticity value (e.g., $T_{max}$) using the following formula:

$T_{max}$=3×(98th percentile of spaces allocated by other stores within the enterprise as indicated by the sales and space dataset).

Where $T_{max}$ represents the largest amount of space allocated to the product, which would yield the maximum amount of sales. In other words, the analytics server may determine the 98th percentile of the overall space allocated to a product within each store within the sales and space dataset (e.g., all the stores within the enterprise that offer similar products) and determine the $T_{max}$ by multiplying that number by a factor of 3 or 3.5.

Similarly, the analytics server may calculate the minimum elasticity value (e.g., $T_{min}$) using the following formula:

$T_{min}$=0.922×($2^{nd}$ percentile of space allocated by other stores within the enterprise as indicated by the sales and space dataset).

Where $T_{min}$ represents the least amount of space allocated to the product, which would yield the minimum amount of sales. In other words, the analytics server may determine the $2^{nd}$ percentile of the overall space allocated to a product within each store within the sales and space dataset (e.g., all the stores within the enterprise that offer similar products) and determine the $T_{min}$ by multiplying that number by a factor of 0.922.

While the multipliers to calculate the upper and lower bounds of elasticity are shown as 0.922, 3, 3, or 3.5, a person skilled in the art will appreciate that the analytics server may use any other multiplier or factor based on the stores within the enterprise to calculated said bounds. In some embodiments, the analytics server may receive the factors (e.g., 0.922 for the lower elasticity limit and 3.5 for the upper elasticity limit) from the client device. The analytics server may provide an option for the client to input different factors to calculate the elasticity in the user interface. The analytics server may dynamically adjust an elasticity value associated with a second dataset, wherein the second dataset comprises second dataset data points corresponds to space allocated to the product and the product performance value associated with the first institution. The analytics server may generate a second dataset (e.g., a dataset representing the target store or the store for which the optimization is requested) and dynamically adjust the elasticity value, associated with the second dataset, based on elasticity value calculated above (e.g., based on space values of other stores within the enterprise).

At step 260, the analytics server may automatically and iteratively determine the elasticity value and the corresponding asymptote value based on the identified data points and the calculated elasticity range. The analytics server may iteratively calculate an elasticity value (and the corresponding asymptote value) based on the identified data points (e.g., space and sales data points for the desired store) within the elasticity range. The analytics server may use the following formula to calculate the elasticity and the asymptote values:

$$K\left(1 - e^{\frac{-Space}{t}}\right) = \text{Sales}$$

$$K\left(1 - e^{\frac{-2*Space_{max}}{t}}\right) >= .99 * K$$

$$\left(1 - e^{\frac{-2*Space_{max}}{t}}\right) >= .99$$

$$.01 >= e^{\frac{-2*Space_{max}}{t}}$$

-continued $$\log.01 >= \frac{-2*\text{Space}_{max}}{t}$$

$$t <= \frac{-2*\text{Space}_{max}}{\log.01}$$

Where K represents the asymptote value and T represents the elasticity value. In an embodiment, the analytics server may calculate (as illustrated above) an elasticity range ($t_{min}$–$t_{max}$) and unbounded K and T values (e.g., without considering $t_{min}$–$t_{max}$) and find a curve, which best fits the data points without any bounds or limitations. If the unbounded T value is within the elasticity range (e.g., $t_{min}$–$t_{max}$), the analytics server may accept the T value (and the corresponding K value) and the process may end. However, if the T value is outside the range of $t_{min}$–$t_{max}$, the analytics server may dynamically adjust the T value to reflect the elasticity bound. For example, if $t_{min}$ is determined to be 50, $t_{max}$ is calculated to be 150, and unbounded T value is calculated to be 190, the analytics server may dynamically adjust/reduce the T value to $t_{max}$ (e.g., 150). In other embodiments the analytics server may adjust the T value to reflect the closest bound. For example, a calculated unbounded T of 10 may be adjusted to 50 based on $t_{min}$. The analytics server may then iteratively calculate a bounded T value and a corresponding asymptote value (e.g., K value), based on the new elasticity range (e.g., the analytics server may calculate the asymptote value based on all the T values within the new range of ($t_{min}$–$t_{max}$)). In other words, the analytics server may first calculate an unbounded K and T values, bound the data points in response to the T value being outside the elasticity range, and iteratively recalculate a bounded elasticity and asymptote value.

The analytics server may determine which K and T values are the best fit (e.g., represent the asymptote and elasticity) by determining the sales increase for values higher than K. For example, if the K value calculated is 25 feet, the analytics server may determine the sales volume for 25 feet ($S_{25ft}$) and sales volume for 26 feet ($S_{26ft}$); the increase from $S_{25ft}$ to $S_{26ft}$ may not be higher than a threshold, which indicates that K value (e.g., 25 feet) is a true asymptote. The threshold may be a pre-set value or may be received, by the analytics server, from the client device. The analytics server may iteratively recalculate the K value based on the upper and lower elasticity range values and the increment value. In some embodiments, the increment value may be a pre-set value or may be received from the client device. The analytics server may iteratively repeat the calculation until the asymptote value is within the adjusted elasticity range for the target store (e.g., elasticity range within the second dataset). For example, if $t_{min}$=500, $t_{max}$=1500, and the increment elasticity value is set to 1, the analytics server may iteratively calculate 1000 different K and T values, according to the above-mentioned formula.

At step 270, the analytics server may generate an optimized space dataset comprising all the data points within the optimized sales vs. space graph ($t_{min}$, $t_{max}$, T, and k values). The analytics server may also generate a graphical representation of the data points within the optimized dataset (second dataset) configured to display and illustrate an optimization trend. The analytics server may use variety of regression modeling to determine a best space vs. sales trend. In some embodiments, the graphical representation of the optimized data points may be accomplished by regression analysis and modeling. Regression analysis, as used herein, is a statistical process for estimating the relationships among variables (e.g., sales and space variable). Regression analysis helps one understand how the typical value of the dependent variable (e.g., sales volume) changes when the independent variable (e.g., space) is varied. The trend, as used herein, is a graphical representation of the regression function of the independent variables. The analytics server may also generate a notification and display the trend on a user computing device. In some embodiments, the analytics server may generate a graphical user interface (or update the information of an existing user interface) in order to display the space dataset. The analytics server may modify the data points based on the overall diminishing return curve (as explained above) and generate a new/modified optimized space dataset. The analytics server may also generate a spreadsheet including different data points within the optimized space dataset and display said spreadsheet on the client-computing device.

Figure 4:
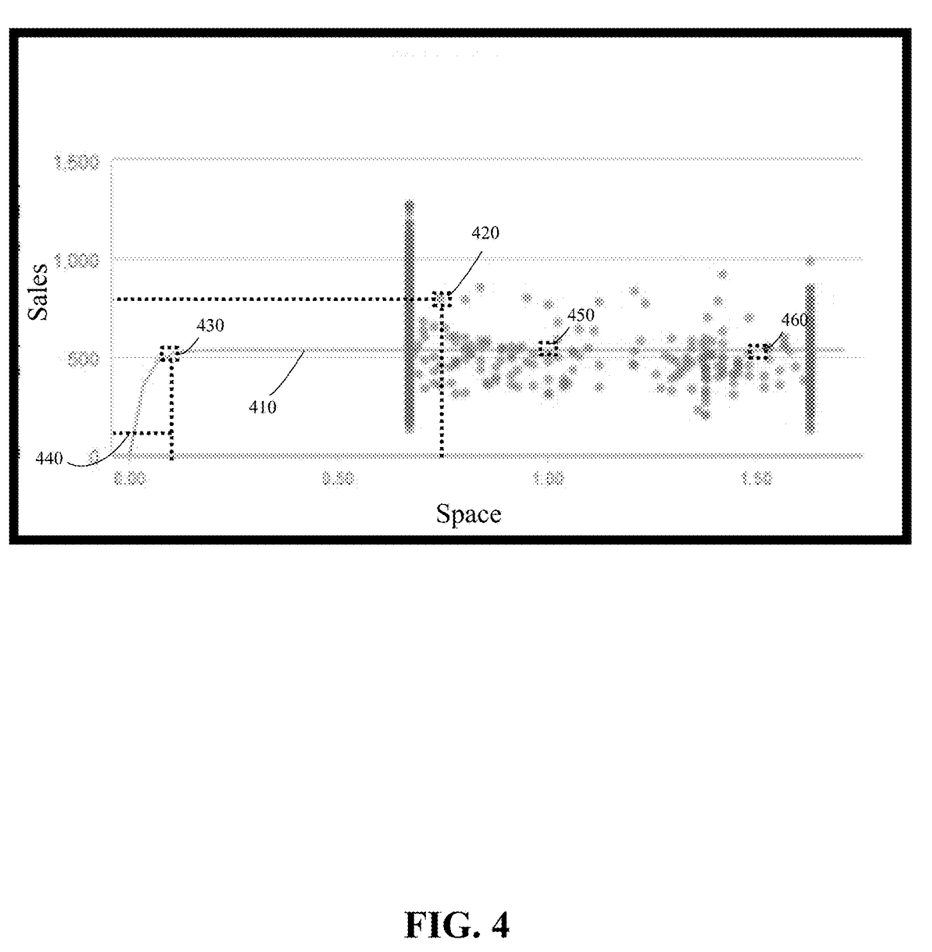
FIG. 4 illustrates distribution of sales in relation to space data points, according to an embodiment.
Figure 5:
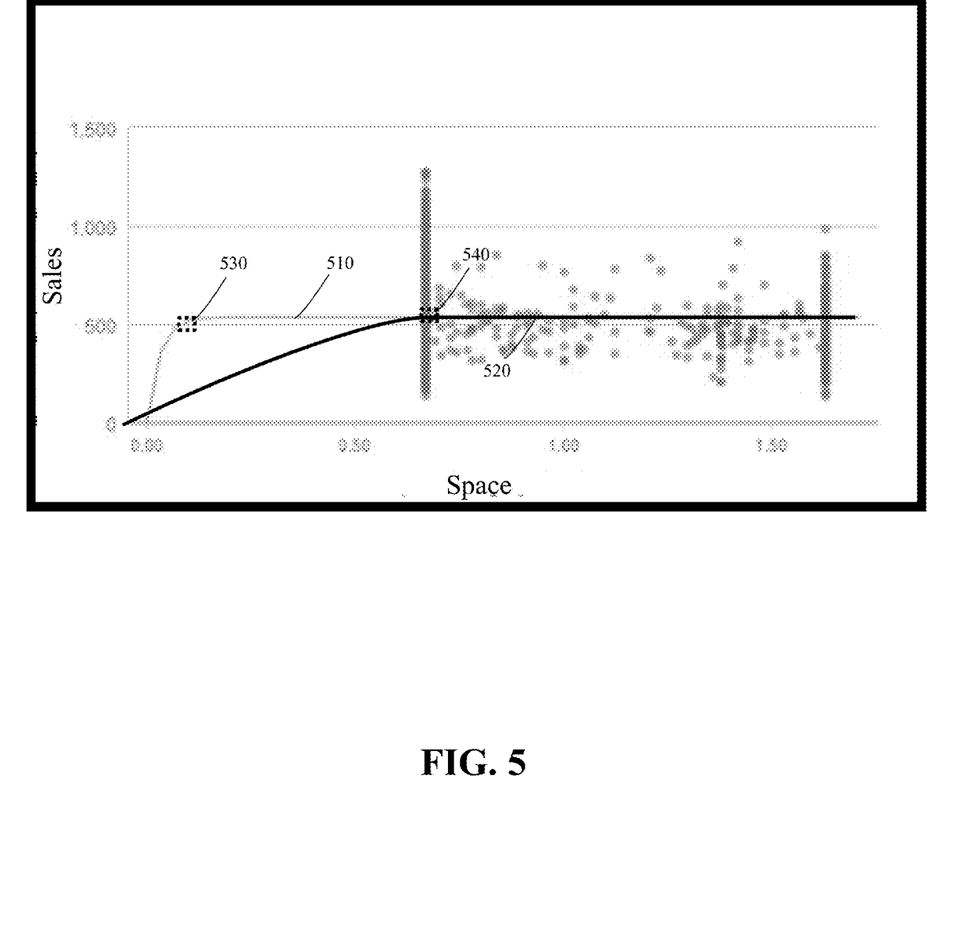
FIG. 5 illustrates distribution of sales in relation to space data points, according to an embodiment.

FIG. 5 illustrates distribution of sales in relation to space data points, according to an embodiment. The analytics server may graphically represent the regression model or the optimized space dataset on the client device (or a user interface associated with the client device). Graph 510 represents a conventional regression model that is calculated using conventional methods and without the benefit of a software solution described within the present disclosure (e.g., without a bounded and limited elasticity model). Graph 510, similar to graph 410 of FIG. 4, represents undesirable and unrealistic data because graph 510 has a small elasticity value, which yields an unrealistic asymptote value represented by data point 530. The analytics server may optimize the sales and space dataset and generate a more realistic graph with a larger elasticity value (e.g., graph 520), which has an asymptote value represented by data point 540. In this embodiment, the graph 520 is generated, by the analytics server, using a regression modeling (e.g., regression line representing all the data points shown in FIG. 5) and also represents a trend for projecting sales values give different spaces allocated to product X.

In some embodiments, the analytics server may account for other products, items, and departments while optimizing the space (e.g., optimizing a combination of products). Optimizing one product at a time may not be ideal for some stores (or departments within a store). For example, when the space allocated to one item is optimized and increased, the space allocated to other items must be reduced because of the confined nature of shelving space within the store. This reduction may not desirable due to a variety of factors. For example, the price or the profitability of the second item may be higher or more desirable than the first item. As a result, optimizing/increasing the space allocated to the first item may result in an overall decrease in profits. In another example, many stores may experience temporary or permanent demand increases due to a variety of factors, such as the store's physical location and/or seasonal demands. For example, a client with a store near a baseball stadium may need to allocate certain portions of the store to baseball memorabilia and baseball-related products. The analytics server may account for multiple items in order to generate an optimized store space comprising of different (or in some embodiments all the items) within the store.

In some embodiments, elasticity limits may be defined by the user or calculated based on criteria received from the user device (e.g., other similar stores). The elasticity limits can be defined as values that help limit the optimization of asymptote and elasticity in order to save/reduce computing power and time. Calculating an asymptote with different elasticity values is an intense process and may use computer resources because of the high number of combinations. For example, the number of combination may be in thousands for one item within one department and potentially infinite number of combinations given different increments of the elasticity value for each K value. The analytics server may drastically reduce the time and computational resources spent by limiting this combination within the confines of the elasticity limit.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a server from a user interface, a request to generate an optimized space dataset, wherein the received request comprises identification associated with a product and a first institution;

generating, by the server, a first instruction configured to receive a first dataset comprising at least one of a space allocated to the product, product attribute, and product performance value corresponding to a plurality of institutions, wherein the plurality of institutions comprises at least the first institution;

upon transmitting the first instruction to a first database, receiving, by the server, the first dataset;

identifying, by the server, a plurality of first dataset data points, wherein each first dataset data point corresponds to the space allocated to the product and the product performance value associated with the plurality of institutions;

automatically calculating, by the server, an elasticity range based on the space allocated to the product, wherein the elasticity range represents a maximum elasticity range value and a minimum elasticity range value each representing maximum and minimum product space value associated with the plurality of institutions;

determining, by the server, an unbounded elasticity value and a corresponding asymptote value based on a second dataset, wherein the second dataset comprises second dataset data points corresponding to space allocated to the product and the product performance value associated with the first institution;

in response to the unbounded elasticity value being outside the elasticity range, dynamically adjusting, by the server, the elasticity value based on the elasticity range;

iteratively calculating, by the server, a bounded asymptote value and a bounded elasticity value based on the second dataset data points until the bounded asymptote and elasticity values are within the adjusted elasticity range, wherein a number of iterative calculations is based on the adjusted elasticity range and an incremental value;

generating, by the server, a graphical representation of the second dataset data points, wherein the graphical representation is configured to illustrate an optimized space trend comprising plurality of data points; and generating, by the server, a second instruction configured to display plurality of second set data points on the user interface.

2. The method of claim 1, wherein the minimum elasticity value is calculated by multiplying a second percentile of space allocated to the product within a plurality of spaces allocated to the product within the plurality of institutions by a first multipliers.

3. The method of claim 2, wherein the first multiplier is about 0.922.

4. The method of claim 2, wherein the first multiplier is received, by the server, from the user interface.

5. The method of claim 1, wherein the minimum elasticity value is calculated by multiplying 98th percentile of space allocated to the product within a plurality of spaces allocated to the product within the plurality of institutions by a second multipliers.

6. The method of claim 5, wherein the second multiplier is about 3.

7. The method of claim 5, wherein the second multiplier is about 3.5.

8. The method of claim 5, wherein the second multiplier is received, by the server, from the user interface.

9. The method of claim 1, wherein the incremental value is received, by the server, from the user interface.

10. The method of claim 1, wherein the first dataset is received, by the server, from the user interface.

11. A computer system comprising:
a server configured to:
receive from a user interface, a request to generate an optimized space dataset, wherein the received request comprises identification associated with a product and a first institution;
generate a first instruction configured to receive a first dataset comprising at least one of a space allocated to the product, product attribute, and product performance value corresponding to a plurality of institutions, wherein the plurality of institutions comprises at least the first institution;
upon transmitting the first instruction to a first database, receive the first dataset;
identify a plurality of first dataset data points, wherein each first dataset data point corresponds to the space allocated to the product and the product performance value associated with the plurality of institutions;
automatically calculate an elasticity range based on the space allocated to the product, wherein the elasticity range represents a maximum elasticity range value and a minimum elasticity range value each representing maximum and minimum product space value associated with the plurality of institutions;
determine an unbounded elasticity value and a corresponding asymptote value based on a second dataset, wherein the second dataset comprises second dataset data points corresponding to space allocated to the product and the product performance value associated with the first institution;
in response to the unbounded elasticity value being outside the elasticity range, dynamically adjusting, by the server, the elasticity value based on the elasticity range;
iteratively calculate a bounded asymptote value and a bounded elasticity value based on the second dataset data points until the bounded asymptote and elasticity values are within the adjusted elasticity range, wherein a number of iterative calculations is based on the adjusted elasticity range and an incremental value;
generate a graphical representation of the second dataset data points, wherein the graphical representation is configured to illustrate an optimized space trend comprising plurality of data points; and
generate a second instruction configured to display plurality of second set data points on the user interface.

12. The computer system of claim 11, wherein the minimum elasticity value is calculated by multiplying $2^{nd}$ percentile of space allocated to the product within the plurality of spaces by a first multipliers.

13. The computer system of claim 12, wherein the first multiplier is about 0.922.

14. The computer system of claim 12, wherein the first multiplier is received, by the server, from the user interface.

15. The computer system of claim 11, wherein the minimum elasticity value is calculated by multiplying 98th percentile of space allocated to the product within the plurality of spaces by a second multipliers.

16. The computer system of claim 15, wherein the second multiplier is about 3.

17. The computer system of claim 15, wherein the second multiplier is about 3.5.

18. The computer system of claim 15, wherein the second multiplier is received, by the server, from the user interface.

19. The computer system of claim 11, wherein the incremental value is received, by the server, from the user interface.

20. The computer system of claim 11, wherein the first dataset is received, by the server, from the user interface.

* * * * *